Jan. 13, 1959 G. C. SOUTHWORTH 2,868,980

FREQUENCY CHANGER AND WAVE AMPLIFIER

Filed Dec. 13, 1956 2 Sheets-Sheet 1

INVENTOR
G. C. SOUTHWORTH
BY Roy M. Porter, Jr.
ATTORNEY

Jan. 13, 1959 G. C. SOUTHWORTH 2,868,980

FREQUENCY CHANGER AND WAVE AMPLIFIER

Filed Dec. 13, 1956

2 Sheets-Sheet 2

INVENTOR
G.C. SOUTHWORTH
BY Roy M. Porter, Jr.
ATTORNEY 2,868,980

FREQUENCY CHANGER AND WAVE AMPLIFIER

George C. Southworth, Chatham, N. J., assignor to Bell Telephone Laboratories, Incorporated, New York, N. Y., a corporation of New York Application December 13, 1956, Serial No. 628,184

10 Claims. (Cl. 250—36)

This invention relates to microwave energy devices and more particularly to improved methods of and a means for amplifying microwaves and generating super-high frequency waves.

With the extension of the useful limit of the frequency spectrum into higher and higher frequencies, the need for equipment and methods for generating millimeter waves becomes more acute with the failure of centimeter wave devices to satisfactorily perform, in these new frequency regions, the functions of generation and amplification. It is known in the art that centimeter waves may be shifted in frequency to millimeter waves by use of the Doppler effect. Known devices of this sort operate by wave energy impinging upon and being reflected from concentrations of charged particles in the form of thin disk-like or space quantized concentrations of electrons. However, the equipment necessary for generating the electron barriers from which the wave energy is reflected is cumbersome since not only is electron generating equipment required but also means for focusing and controlling the electrons as well as circuitry for preventing the accumulation of charge.

It is therefore an object of the invention to provide improved methods of and means for generating super-high frequency radio energy resulting from the Doppler effect.

It is also known in the art that electromagnetic wave energy may be amplified by utilizing a stream of electrons from which energy is transferred to a traveling electromagnetic wave. Traveling wave tubes used in this manner for amplification have provided excellent results. However, as is well known, the equipment associated with the generation, control and dissipation of the electrons is complex and has critical operating parameters which must be observed.

It is therefore another object of this invention to provide improved methods of and means for amplifying electromagnetic wave energy.

Furthermore, it is an advantage peculiar to this invention that frequency multiplication and wave amplification are accomplished without any physical moving parts or the motion of charged particles through space.

In accordance with the invention it has been discovered that a "virtual" or nonmaterial disturbance akin to a reflecting boundary or barrier advancing along a transmission path may be developed by the interaction of electromagnetic wave energy in one class of modes with certain materials having a nonlinear intrinsic impedance characteristic. On the one hand this advancing barrier will serve to reflect a carrier signal in the form of certain other modes of electromagnetic wave energy advancing in a direction and sense opposite to that of the barrier, whereby the frequency of the reflected carrier signal wave energy is increased by virtue of the Doppler effect. On the other hand, certain modes of electromagnetic energy traveling in the same direction as, but at a lower velocity than, the barrier will receive energy therefrom in the same manner as water waves receive energy from winds blowing over them. This barrier is actually a virtual discontinuity which propagates along a wave guiding structure. The virtual discontinuity is achieved by generating an abrupt impedance change traveling along the nonlinear medium of the wave guiding path which effectively constitutes a transverse wave of reflection coefficient change.

In accordance with the invention a hollow, circular, metallic sheath-type wave guide contains a thin hollow cylindrical element of gyromagnetic material whose outside face is contiguous to the inside face of the circular wave guide whereby the wave guide may be considered loaded around its internal circumference. A direct-current magnetic biasing field is applied to the gyromagnetic cylinder in a direction parallel to its longitudinal axis. The strength of the biasing field is fixed at a level providing a particular permeability for the gyromagnetic cylinder. This permeability level results in a reflection coefficient as between the gyromagnetic material and its surrounding medium, of a given value between zero and one. The direct-current magnetic biasing point is further characterized in that it is within a region of rapid nonlinear change in permeability and therefore reflection coefficient. Transverse electric wave energy such as that of the $TE_{01}$-type in circular guides, which has a concentration of longitudinal magnetic components near the inside surface of the circular guide, is propagated along the wave guide through the gyromagnetic cylinder. Consequently the magnetic components of the wave energy are concentrated at the internal periphery of the wave guide which is precisely the region occupied by the gyromagnetic material. Furthermore, it may be noted that the longitudinal magnetic components of the wave are parallel to the external direct-current magnetic biasing field applied to the gyromagnetic cylinder. Therefore, the magnetic components of the radio frequency energy are superimposed upon the magnetic biasing field and serve to reinforce and interfere with the applied biasing field in a wavelike fashion. As a consequence the effective bias applied to the ferrite is the algebraic sum of the external applied biasing field and the magnetic components of radio frequency energy. Since the applied magnetic bias is fixed at a point between maximum and minimum reflection coefficient in a nonlinear region, the contribution of the radio frequency magnetic components serves to vary the biasing point from a point of maximum reflection coefficient to a point of minimum reflection coefficient. This variation conforms to the variation in the magnetic components of the radio frequency wave. Therefore, it may be seen that the reflection coefficient varies as a true transverse wave. Consequently, as a transverse electric wave front propagates through the gyromagnetic material a wave of reflection coefficient change also propagates therethrough. Each wave front of reflection coefficient change therefore constitutes a reflecting front.

When, in a first embodiment in accordance with the invention, a carrier signal in the form of a transverse magnetic wave, i. e., a wave whose magnetic components are everywhere transverse to the direction of propagation, is propagated through the wave guide it in no way contributes to, hinders or affects the biasing level of the gyromagnetic material since its magnetic components are always perpendicular to the applied longitudinal biasing field and the magnetic components of the transverse electric wave. If the transverse magnetic wave is propagated through the gyromagnetic cylinder in a parallel direction but opposite sense from that of the transverse electric wave, it will meet oncoming wave fronts of reflection coefficient change. The wave fronts of reflection coefficient change constitute reflective virtual barriers around the periphery of the wave guide wherein the gyromagnetic material is located, which wave fronts are advancing in a sense opposite to that of the transverse magnetic wave. Consequently the transverse magnetic wave carrier signal will be reflected back to its source. Since the wave fronts of reflection coefficient change are moving, the transverse magnetic wave will be reflected back at a frequency higher than its incident frequency because of the Doppler effect. After multiple reflections between the virtual barriers of the hollow cylinder and the source, the frequency of the carrier signal will be high enough so that the carrier signal will propagate through the hollow portion of the gyromagnetic cylinder, and will continue propagating through the wave guide in the same direction and sense in which it was initially launched. This results from the fact that the internal diameter of the cylinder corresponds to a cut-off frequency lower than that of the reflected carrier signal and so the hollow portion of the cylinder will support the propagation of wave energy at the multiplied frequency.

In a second embodiment in accordance with the invention the transverse magnetic wave carrier signal is propagated through the gyromagnetic cylinder in the same direction and sense as the wave of reflection coefficient change, i. e., in the same direction as the transverse electric wave. A transverse electric mode is utilized which travels at a speed somewhat greater than that of the transverse magnetic carrier signal. As a consequence the reflecting barrier which propagates in the same direction and sense as the transverse magnetic wave will be traveling somewhat faster than the transverse magnetic wave. This is a situation quite analogous to that of traveling wave tubes wherein the energy from a stream of electrons is imparted to a traveling wave by virtue of their coupling relationship and the fact that the electron stream is traveling at a velocity somewhat greater than that of the traveling wave. In analogous manner, therefore, the advancing barrier serves to impart a substantial portion of the energy contained in the transverse electric wave to the transverse magnetic wave whereby the transverse magnetic wave is amplified.

These and other objects and features of the present invention, the nature of the invention and its advantages, will appear more fully upon consideration of the various specific illustrative embodiments shown in the accompanying drawings and of the following detailed description.

Figures 1, 3:
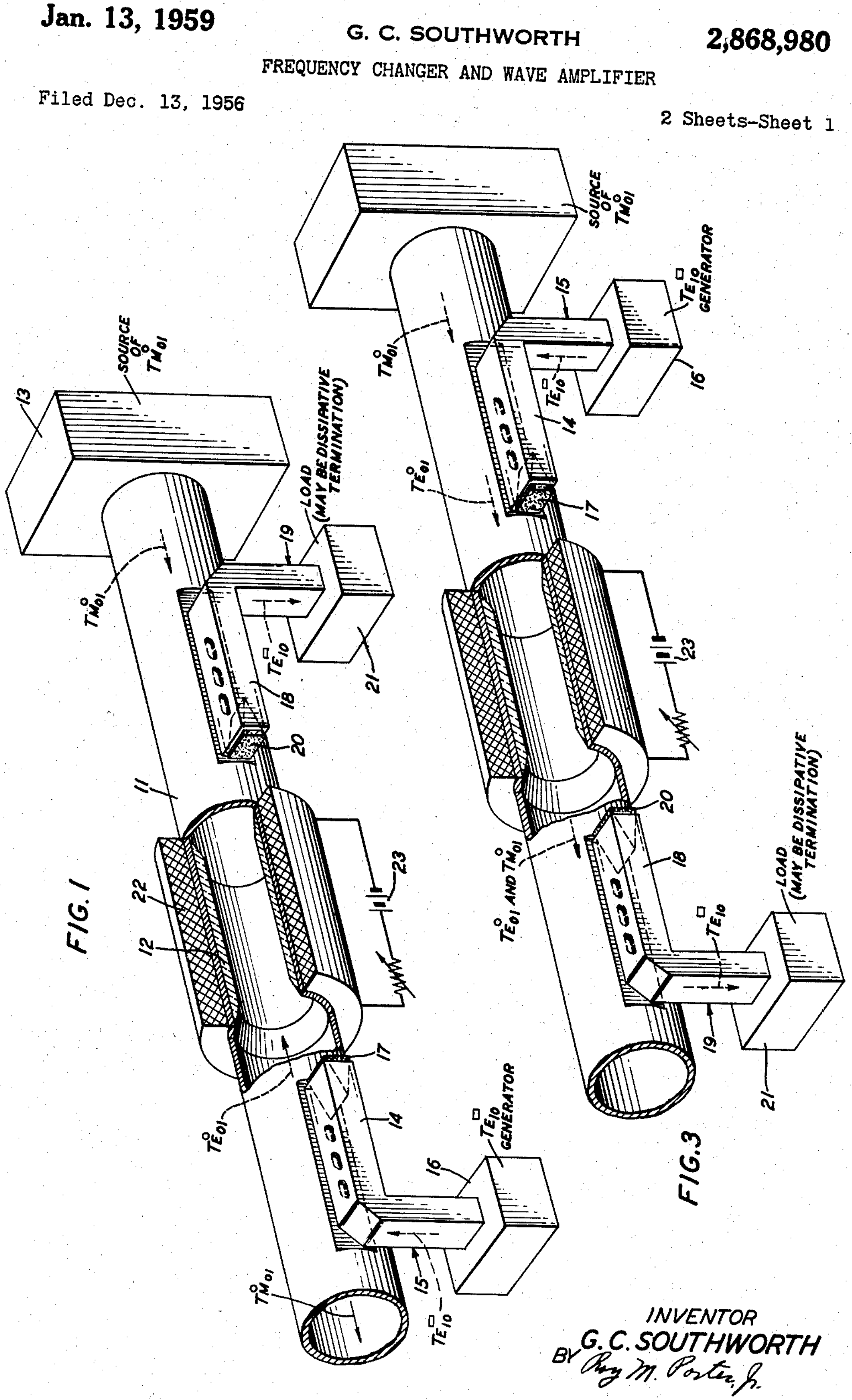
Fig. 1 is a perspective view of a frequency multiplier in accordance with the invention.
Fig. 3 is a perspective view of an electromagnetic wave amplifier in accordance with the invention.

In the discussion that follows all electromagnetic mode designations refer to waves in circular wave guides unless otherwise indicated. Referring more specifically to Fig. 1, there is disclosed an illustrative embodiment, given by way of example, of a frequency multiplier for generating superhigh frequency wave energy in accordance with the invention. Fig. 1 comprises a wave guiding path within which is disposed an element of material which is non-linear with respect to its intrinsic impedance, and means for simultaneously propagating in parallel directions a transverse electric wave in one sense through the non-linear element and a transverse magnetic wave in the opposite sense through said element. The wave guiding path may be a hollow metallic sheath-type wave guide 11 having a circular transverse cross section. Disposed within wave guide 11 is a thin hollow cylindrical element 12 of gyromagnetic material, e. g., ferrite, which material is characterized in having electrons capable of being aligned by an external magnetic field and capable of exhibiting the precessional motion of a gyroscopic pendulum. An important feature of this material will be discussed relative to Figs. 2A, 2B and 2C. Cylinder 12 is coaxially located within wave guide 11. The outside surface of hollow cylinder 12 is contiguous to the inside surface of circular wave guide 11. Since gyromagnetic cylinder 12 is hollow, wave guide 11 is therefore effectively loaded peripherally around its internal circumference. Each end of cylinder 12 is tapered so as to preclude or minimize wave reflections due to physical discontinuities. Circumscribing wave guide 11 and coextensive with cylinder 12 is a solenoid 22 which is excited by a direct-current source which may be a battery 23. Solenoid 22, therefore, serves to provide a magnetic bias to gyromagnetic cylinder 12 which bias is parallel to the common longitudinal axis of the cylinder and wave guide 11. At the right-hand end of wave guide 11 and coupled thereto is a source 13 of transverse magnetic wave carrier frequency signals. In particular, source 13 is disclosed as a source of $TM_{01}$ wave energy. To the left of cylinder 12 is a means 14 for coupling transverse electric wave energy into wave guide 11. Coupler 14 is a directional coupler such as that disclosed in United States Patent No. 2,748,350, granted to S. E. Miller, June 7, 1956. This coupler is of the type which will excite $TE_{01}$ wave energy in guide 11 when rectangular guide 15, coupled to guide 11 thereby, is excited by dominant rectangular mode $TE_{10}$ wave energy. Coupled to rectangular guide 15 on the left-hand side of directional coupler 14 is a source 16 of $TE_{10}$ rectangular mode wave energy. Directional coupler 14 is terminated at its right-hand end by dissipative termination 17. As a consequence, $TE_{10}$ rectangular mode wave energy from source 16 excited in wave guide 15 will excite in wave guide 11 $TE_{01}$ circular mode wave energy by virtue of directional coupler 14. In accordance with the teachings of the above-mentioned patent of Miller, this directional coupler is mode-selective so that only the $TE_{01}$ mode may be excited in circular wave guide 11 and conversely only the $TE_{01}$ mode in guide 11 may excite wave energy in guide 15. More specifically, directional coupler 14 will reject $TM_{01}$ wave energy propagating along wave guide 11. Since coupler 14 is directional, the $TE_{01}$ wave energy excited in guide 11 by coupler 14 will propagate to the right through gyromagnetic cylinder 12. To the right of cylinder 12 and in between said cylinder and source 13, is disposed another directional coupler 18 similar in all respects to directional coupler 14. However, the left-hand side of directional coupler 18 is terminated in a dissipative termination 20. Guide 19, which is an extension of coupler 18 on the right-hand side thereof, may be terminated in a load impedance utilizing means or also in some dissipative termination 21. It may be seen therefore that $TE_{10}$ rectangular mode wave energy from source 16 excites the $TE_{01}$ mode in wave guide 11 via coupler 14; the $TE_{01}$ energy propagates through gyromagnetic cylinder 12 and then is selectively removed from guide 11 by virtue of coupler 18. $TM_{01}$ wave energy from source 13 will propagate to the left past coupler 18 and then to cylinder 12 without in any way being effected by coupler 18 by virtue of the mode selective properties of that coupler. For a detailed description of the mode-selective properties and structural arrangement of couplers 14 and 18 reference may be had to the above-mentioned United States patent to S. E. Miller.

For a proper understanding of the operation of Fig. 1, let us consider how the electromagnetic field configuration of the $TE_{01}$ mode interacts with gyromagnetic cylinder 12 and the applied magnetic bias to create a moving virtual barrier. The $TE_{01}$ mode is a transverse electric mode and therefore all the electrical components are transverse to the direction of propagation of wave energy; there are no longitudinal electric components whatsoever. The magnetic components of this wave, however, are both longitudinal and transverse. More specifically, the longitudinal components are concentrated around the circumference of wave guide 11 and also along its longitudinal axis. Concentrations of transverse components occur periodically every half wave-length. Therefore, at the internal surface of guide 11, there is a concentration of longitudinal magnetic components. Since hollow cylinder 12 has a thin wall, it may be seen that longitudinal magnetic components of the $TE_{01}$ mode exist to the substantial exclusion of transverse magnetic components in the region wherein the thin hollow gyromagnetic element 12 is located. Therefore, the magnetic componnets of the $TE_{01}$ mode which exist in the wall of cylinder 12 are parallel to the externally applied magnetic biasing field of solenoid 22. As a consequence, the longitudinal components of the $TE_{01}$ mode are superimposed upon the biasing field applied by solenoid 22. Since the magnetic components of the $TE_{01}$ wave are part of that mode's field configuration they will vary in time and in space in a wave-like manner. Consequently, they will reinforce and interfere with the externally applied magnetic bias. This serves to increase and decrease the resultant magnetic field biasing the ferrite about a fixed value, namely that value determined by the direct-current source supplying solenoid 22.

Figure 2A:
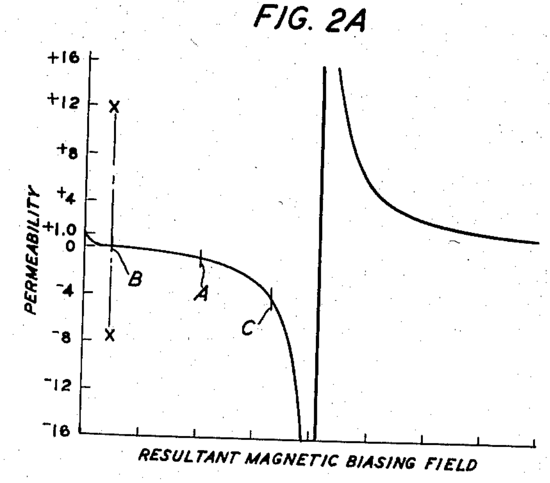
Figs. 2A, 2B and 2C are graphical representations, given for the purpose of explanation of certain parameters related to gyromagnetic material.
Figure 2B:
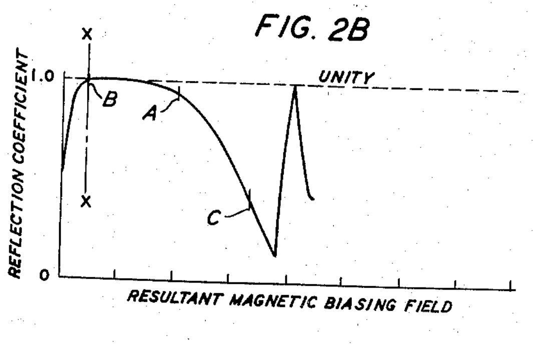

The consequence of this variation in the applied bias may be ascertained by considering Fig. 2A. The curve represents a well-known permeability versus applied biasing magnetic field curve for ferrite such as disclosed in "The Ferromagnetic Faraday Effect at Microwave Frequencies and Its Applications," by C. L. Hogan, appearing in "Review of Modern Physics," volume 25, Number 1 at Fig. 11. Although this curve will vary from one composition of ferrite to another, and also with frequency, the overall shape of the curve will generally be substantially as indicated. This permeability characteristic is exhibited to a wave whose magnetic components in the gyromagnetic material are perpendicular to the applied magnetic biasing field. Point A of Fig. 2A indicates the biasing level afforded the ferrite by the direct-current field applied by solenoid 22. Point B indicates the effective biasing point resulting from the superposition of the longitudinal magnetic component of the $TE_{01}$ wave when the sense of the component is opposite to that of the external applied biasing field. Point C indicates the effective biasing point when the superposed magnetic components are in the same sense as the applied biasing field. Since the permeability of a dielectric material is one factor in determining its intrinsic impedance, $Z=(\mu/\epsilon)^{1/2}$, and since the intrinsic impedance of the material relative to another material determines its reflection coefficient, we may utilize the curve of Fig. 2A to ascertain the reflective properties of the gyromagnetic material in the region of interest. Where the permeability, $\mu$ is equal to zero the intrinsic impedance is then also equal to zero and the gyromagnetic material is highly conductive and acts as a reflective conductive discontinuity, with a reflection coefficient substantially equal to unity. When the permeability is greater or less than zero the reflection coefficient assumes values less than unity, i. e., the gyromagnetic material reflects less efficiently. Thus Fig. 2B represents an approximate plot of reflection coefficient versus resultant magnetic bias. It may be seen from Fig. 2B that point A corresponding to the bias afforded solely by solenoid 22, is a point intermediate the maximum and minimum points of reflection. Point B, resulting from the externally applied bias interfering with the magnetic components of the $TE_{01}$ wave, corresponds to the point of maximum reflection while point C corresponds to the reinforcing of these two biases and results in the smallest reflection. Care must be taken that the amplitude of the $TE_{01}$ mode be not so great as to drive point C much more to the right than is indicated, otherwise point C will be located too far inside the gyromagnetic resonance loss region and the $TM_{01}$ mode (to be discussed below) will suffer excessive loss. As a $TE_{01}$ wave propagates through the ferrite, its longitudinal magnetic components reinforce and interfere with the externally applied magnetic bias in a wave-like fashion. Consequently, the reflection coefficient of the gyromagnetic material will vary as a function of time and space. That is, concomitant with the passage of a $TE_{01}$ wave through the gyromagnetic cylinder a wave of reflection coefficient change will also propagate therethrough. This is analogous to having the wave guide itself constricted to a thickness depending on the properties of the gyromagnetic cylinder, which constriction moves along the wave guiding path wherein the gyromagnetic material exists. Thus we see that a virtual reflecting surface or barrier proceeds down the wave guide.

Figure 2C:
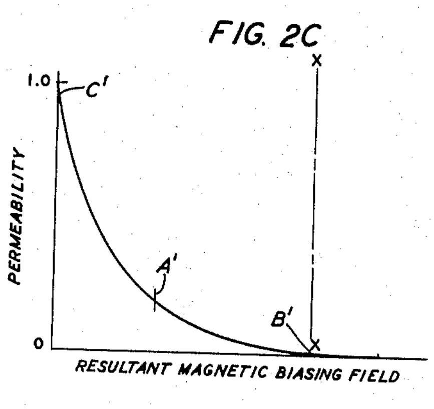

Another convenient operating region is indicated in Fig. 2C. This region is an expanded scale representation of that part of Fig. 2A lying between the ordinate and line X—X. Point A' is an alternative biasing level provided by the externally applied direct-current magnetic biasing field and corresponds functionally to point A of Figs. 2A and 2B. Point B' is identical to point B and is the point of zero permeability and reflection coefficient of unity. Point C' is the point of smallest reflection coefficient. Since point C' is at a permeability of unity, its absolute value is less than that of point C of Figs. 2A and 2B. Thus the reflection coefficient of point C' will be greater than that of point C. Accordingly the differential between maximum and minimum values of reflection coefficient due to the values of permeability indicated in Fig. 2C is less than that of Figs. 2A and 2B. Thus the latter figures provide a greater reflection coefficient differential and for most applications provides the preferred operating range. However, it may be noted that Fig. 2C does not require as large an applied direct-current biasing field or as large an amplitude for the $TE_{01}$ wave.

Since the $TM_{01}$ carrier signal, which is the wave energy whose frequency we are interested in multiplying, propagates in the opposite sense from that of the $TE_{01}$ wave and therefore opposite to the virtual reflecting discontinuity it is susceptible to being reflected from the advancing discontinuity. The $TM_{01}$ wave is of the type wherein all its magnetic components are oriented transverse to the direction of propagation; the magnetic lines of force may be considered as comprising a plurality of concentric circles whose planes are perpendicular to the direction of propagation. Ordinarily the $TM_{01}$ wave may propagate simultaneously with the $TE_{01}$ wave in an unloaded wave guide without any interaction or coupling between the two modes. It may be noted that since all the magnetic components of the $TM_{01}$ wave are transverse to the direction of propagation and therefore to the direction of the externally applied magnetic bias, the $TM_{01}$ wave in no way contributes to the variation in the biasing level of the gyromagnetic material (as distinguished from the case of the $TE_{01}$ wave described relative to Figs. 2A and 2B and 2C). Therefore, the $TM_{01}$ wave in no way affects the virtual reflecting barrier which is advancing towards it. It merely sees the virtual barrier.

At this point it should be noted that the curve of Fig. 2A represents the effective permeability seen by a wave whose magnetic components within the gyromagnetic material are perpendicular to the direction of the applied magnetic field biasing the gyromagnetic material. The gyromagnetic cylinder, therefore, is magnetically relatively transparent to the $TE_{01}$ mode since the magnetic components of that mode are substantially everywhere parallel to the applied field within the gyromagnetic material. The $TM_{01}$ mode, however, has only magnetic components perpendicular to the applied field within the gyromagnetic material. Consequently, the $TM_{01}$ wave will be reflected from each advancing wave front of reflection coefficient change. The reflected $TM_{01}$ wave will of course have its frequency increased from that of the frequency of the incident wave in accordance with the well-known principles of the Doppler effect. It is well known in the art that the frequency multiplication of a reflected wave due to Doppler may be expressed by $$f_r = f_1 \frac{1+\frac{v_1}{v_2}}{1-\frac{v_1}{v_2}}$$

where $f_r$ is the frequency of the reflected wave which is greater than $f_1$, the frequency of the incident wave; $v_1$ is the velocity of the incident wave and $v_2$ is the velocity of the reflecting barrier.

We may now properly consider the overall operation of the embodiment of the invention represented in Fig. 1. $TE_{10}$ rectangular mode wave energy generated from source 16 will excite $TE_{01}$ wave energy in guide 11 traveling to the right by virtue of directional coupler 14. The $TE_{01}$ energy in propagating past biased gyromagnetic cylinder 12 will excite therein a wave of reflection coefficient change propagating down element 12 in the same direction as the $TE_{01}$ wave energy. The $TE_{01}$ mode continuing to the right down wave guide 11 will then be substantially completely removed from guide 11 by directional coupler 18. Therefore, a wave of reflection coefficient change is continuously propagating from left to right through gyromagnetic cylinder 12. $TM_{01}$ mode energy from source 13 propagates to the left along wave guide 11 passing coupler 18 which in no way couples out any of the $TM_{01}$ wave energy because of its mode-selective properties. $TM_{01}$ mode energy on reaching gyromagnetic cylinder 12 is met by a wave front of reflection coefficient change propagating in the opposite sense to the $TM_{01}$ wave. Consequently the $TM_{01}$ wave will be reflected back from this barrier towards source 13. The reflected $TM_{01}$ wave has an increased frequency due to the Doppler effect. Multiple reflections of the $TM_{01}$ wave will then occur between element 12 and source 13 until the frequency of the $TM_{01}$ wave is high enough such that it may propagate to the left through the hollow portion of gyromagnetic cylinder 12. The cut-off wavelength afforded by the virtual discontinuity propagating down the cylinder 12 corresponds to a frequency less than that of the frequency multiplied $TM_{01}$ wave and therefore does not affect said wave. The frequency multiplied $TM_{01}$ wave then will appear to the left of gyromagnetic cylinder 12, will proceed past mode-selective coupler 14 unaffected thereby and then will continue propagating down wave guide 11 to be utilized as desired.

The reflected $TM_{01}$ energy of higher frequency may be removed for utilization in another manner. A frequency sensitive coupler (not shown) may be connected to guide 11 in the region between gyromagnetic element 12 and source 13. With such a coupler selectively sensitive to the higher frequency of the reflected wave, the reflected energy may be coupled out of guide 11 to the exclusion of the incident energy of lower frequency from source 13. Alternatively, a gyrator may be located between element 12 and source 13.

Fig. 3 is an example of an electromagnetic wave amplifier in accordance with the invention, given for purposes of illustration. The structure of this embodiment is in most respects the same as that of Fig. 1. Accordingly, the same reference numerals are used. The structural difference between the embodiments resides in the arrangement and disposition of the launching and isolating means for $TE_{01}$ mode energy. Thus in Fig. 3 elements 14 through 17 appear on the right-hand side of gyromagnetic cylinder 12 and elements 18 through 21 appear on the left-hand side of cylinder 12 instead of vice versa as in Fig. 1. Furthermore, elements 14 through 17 are arranged, as may be seen, to launch $TE_{01}$ wave energy in guide 11 so that the wave energy will propagate from right to left, i. e., in the same sense as the propagation of the $TM_{01}$ mode. Concomitantly, elements 18 through 21 are arranged on the left-hand side of gyromagnetic elements 12 so as to remove the $TE_{01}$ wave energy propagating to the left after it has passed gyromagnetic element 12.

In the operation of this embodiment it may be seen therefore that $TE_{01}$ wave energy launched in guide 11 excites a wave of reflection coefficient change traveling to the left through gyromagnetic cylinder 12. The $TE_{01}$ wave energy, after passing through cylinder 12, is removed from guide 11 at directional coupler 18. The $TM_{01}$ mode from source 13 also propagates down guide 11 to the left. Accordingly, the $TM_{01}$ mode passes through cylinder 12 in the same direction and sense as the wave of reflection coefficient change. Now, the wave of reflection coefficient change is created by the interaction between the $TE_{01}$ wave with the externally applied magnetic bias in gyromagnetic cylinder 12. Accordingly the wave of reflection coefficient change propagates through gyromagnetic element 12 at the same velocity as the $TE_{01}$ wave. It is well known in the art that the velocity of propagation of the $TE_{01}$ mode is somewhat greater than that of the $TM_{01}$ mode. Therefore, the virtual barriers defined by the wave of reflection coefficient change propagate through cylinder 12 at a somewhat greater velocity than the $TM_{01}$ wave energy. As a consequence, the interaction between the virtual barriers and the $TM_{01}$ energy serves to transfer energy from the barrier to the $TM_{01}$ wave in a manner quite analogous to that of the traveling wave tube. However, in accordance with the invention the source of energy is the virtual barrier rather than a stream of electrons. This type of interaction is also analogous to the transmission of energy to a water wave from winds blowing past the wave at a greater velocity of propagation than that of the wave. For a qualitative description of this effect as related to traveling wave tubes, reference may be had to any standard textbook on the subject, for example, my textbook, "Principles and Applications of Waveguide Transmission," D. Van Nostrand & Co., 1950, pages 595 through 601. It may be noted that in accordance with the invention, wave amplification is thus achieved without any moving structure or any moving matter; the effect is due to a nonmaterial discontinuity propagating as a wave.

In the above description of the disclosed embodiments in accordance with the invention, the virtual barrier was generated by varying the intrinsic impedance of the nonlinear gyromagnetic material. This was accomplished by varying the permeability of the material in a wave-like manner. However, a similar effect may be achieved by using material which is nonlinear with respect to dielectric constant rather than with respect to permeability. Varying the dielectric constant in a wave-like manner will also generate a wave of reflection coefficient change, and thus a train of virtual barriers, which may be used in frequency multiplication or amplification. Of course in an arrangement wherein material nonlinear with respect to dielectric constant is used, the biasing field would have to be electric rather than magnetic and accordingly it would be the electric components of the wave superimposed on the electric bias which would give rise to the wave of reflection coefficient change. Suitable loading geometries may be used in accordance with the electric field configuration of the electromagnetic modes of interest. A material embodying both nonlinear permeability and also nonlinear dielectric constant may also be used.

In the embodiments of Figs. 1 and 3, the transmission path was disclosed as a circular metallic wave guide. This is one type of arrangement that is possible. Other wave guiding paths such as rectangular wave guides may also be utilized where the requirements of the overall system indicate their desirability. In such an arrangement a desirable disposition of the nonlinear material, if it is gyromagnetic material that is used, would be to have two slabs of the material, with one on each side of the longitudinal axis of the wave guide. The slabs would each be parallel and adjacent to a narrow wall of the wave guide and magnetically biased in a transverse direction to the propagation of wave energy, with the bias of each being in the opposite sense from that of the other. In this arrangement, the wave energy responsible for generating the virtual barrier would be an appropriate mode of the transverse magnetic type while the carrier signal wave energy upon which the virtual barrier operates would be an appropriate mode of the transverse electric type.

In all cases, it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. In a microwave transmission system a length of hollow pipe metallic wave guide having a circular cross section, a thin hollow cylindrical gyromagnetic element disposed coaxially within said wave guide having its outside surface substantially contiguous to the inside surface of said wave guide, means for applying a magnetic biasing field to said element in a direction parallel to the axis of said cylinder, means for exciting $TE_{01}$ circular mode energy in said wave guide and for directing said $TE_{01}$ energy toward and into said element, a source of $TM_{01}$ circular mode wave energy at a given frequency coupled to said wave guide on the opposite side of said element from said means, and means coupled to said length of wave guide for receiving and collecting $TM_{01}$ wave energy at a frequency substantially higher than said given frequency.

2. For use in an electromagnetic wave transmission system, an electromagnetic wave transmission path, first means for producing electromagnetic wave energy having a first electromagnetic field configuration, means for coupling said wave energy between said first means and said transmission path, a second means for producing electromagnetic wave energy having a second electromagnetic field configuration different from said first field configuration, means for coupling said wave energy having said second field configuration to said transmission path, an element of material having a nonlinear intrinsic impedance versus applied biasing magnetic field characteristic, said element being disposed within said transmission path within a region wherein magnetic components of said first electromagnetic field configuration are perpendicular to magnetic components of said second electromagnetic field configuration, and means for applying a biasing field to said nonlinear element in a direction parallel to said magnetic components of one of said electromagnetic field configurations and perpendicular to every magnetic component of said second electromagnetic field configuration.

3. A combination as recited in claim 2 wherein said biasing field is a steadily applied magnetic field.

4. A combination as recited in claim 3 including means for directing said first electromagnetic wave in said transmission path along a given direction and sense of propagation and means for directing said second electromagnetic wave along said transmission path in a parallel direction but opposite sense of propagation to that of said first electromagnetic wave.

5. A combination as recited in claim 3 including means for directing said first electromagnetic wave in said transmission path along a given direction and sense of propagation and means for directing said second electromagnetic wave along said transmission path in the same direction and sense as that of said first electromagnetic wave.

6. A combination as recited in claim 3 wherein said nonlinear element comprises gyromagnetic material having a nonlinear permeability versus resultant magnetic biasing field characteristic.

7. In an electromagnetic wave transmission system a length of wave guiding transmission line, an element of gyromagnetic material disposed in said line, means for magnetically biasing said element, a source of transverse electric waves directively coupled to said line on one side of said element for propagating transverse electric waves toward said element, and a source of transverse magnetic waves directively coupled to said line on the other side of said element for propagating transverse magnetic waves toward said element.

8. A combination as recited in claim 7 wherein said element is disposed within said transmission line within a region wherein the magnetic components of said transverse electric wave are perpendicular to the magnetic components of said transverse magnetic wave, said element being magnetically biased in a direction perpendicular to said magnetic components of one of said waves and parallel to said magnetic components of the other of said waves.

9. In an electromagnetic wave transmission system a length of wave guiding transmission line, an element of gyromagnetic material disposed in said line, means for magnetically biasing said element, a source of transverse electric waves directively coupled to said line on one side of said element for propagating transverse electric waves towards said element, and a source of transverse magnetic waves directively coupled to said line on the same side of said element for propagating transverse magnetic waves towards said element.

10. A combination as recited in claim 9 wherein said element is disposed within said transmission line within a region wherein the magnetic components of said transverse electric wave are perpendicular to the magnetic components of said transverse magnetic wave, said element being magnetically biased in a direction perpendicular to said magnetic components of one of said waves and parallel to said magnetic components of the other of said waves.

References Cited in the file of this patent

UNITED STATES PATENTS

| | | |
|---|---|---|
| 2,647,239 | Tellegen | July 28, 1953 |
| 2,748,352 | Miller | May 29, 1956 |
| 2,762,871 | Dicke | Sept. 11, 1956 |